United States Patent
Reinauer et al.

(10) Patent No.: US 12,545,342 B2
(45) Date of Patent: Feb. 10, 2026

(54) METHOD FOR INITIALIZING A MOTOR VEHICLE

(71) Applicant: Robert Bosch GmbH, Stuttgart (DE)

(72) Inventors: Anastasia Reinauer, Karlsruhe (DE); Heiko Haegele, Gschwend (DE); Stefan Nordbruch, Leonberg (DE); Thorsten Friedrich, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 1055 days.

(21) Appl. No.: 17/629,587

(22) PCT Filed: Jun. 10, 2020

(86) PCT No.: PCT/EP2020/066061
§ 371 (c)(1),
(2) Date: Jan. 24, 2022

(87) PCT Pub. No.: WO2021/018454
PCT Pub. Date: Feb. 4, 2021

(65) Prior Publication Data
US 2022/0281544 A1    Sep. 8, 2022

(30) Foreign Application Priority Data
Jul. 26, 2019    (DE) .................. 10 2019 211 124.6

(51) Int. Cl.
*G06F 30/15*    (2020.01)
*B62D 63/02*    (2006.01)
*B62D 65/04*    (2006.01)

(52) U.S. Cl.
CPC .......... *B62D 65/04* (2013.01); *B62D 63/025* (2013.01); *G06F 30/15* (2020.01)

(58) Field of Classification Search
CPC ........ B62D 65/04; B62D 63/025; G06F 30/15
See application file for complete search history.

(56) References Cited

U.S. PATENT DOCUMENTS 5,034,889 A * 7/1991 Abe ............... B60K 31/047
                                                73/114.61
6,370,460 B1 * 4/2002 Kaufmann ............ B62D 6/008
                                                340/576

(Continued)

FOREIGN PATENT DOCUMENTS

| DE | 19816287 A1 | 4/1999 |
|---|---|---|
| DE | 102011053254 A1 | 3/2013 |
| DE | 10297132 B4 | 9/2016 |

OTHER PUBLICATIONS

Translation of International Search Report for Application No. PCT/EP2020/066061 dated Sep. 30, 2020 (2 pages).

*Primary Examiner* — Kibrom K Gebresilassie
(74) *Attorney, Agent, or Firm* — Michael Best & Friedrich LLP

(57) ABSTRACT

The invention relates to a method for initializing a motor vehicle, said motor vehicle comprising an assembly having a rolling chassis and a body provided on the rolling chassis. A check is made as to which components and functions are available in the rolling chassis and which components and functions are available in the body. There is a further determination of which components and functions are available in the combined assembly of rolling chassis and body. Parameters are then assigned to the components and functions in the rolling chassis and the body according to this determination. The invention further relates to a device, a rolling chassis, a body, a motor vehicle, a computer program, and to a machine-readable storage medium.

10 Claims, 2 Drawing Sheets

(56) References Cited

U.S. PATENT DOCUMENTS

| | | | |
|---|---|---|---|
| 2003/0047362 A1* | 3/2003 | Chernoff | B60T 1/065 |
| | | | 180/65.245 |
| 2003/0094320 A1 | 5/2003 | Chernoff et al. | |
| 2018/0091596 A1* | 3/2018 | Alvarez | H04L 63/0428 |
| 2019/0344755 A1* | 11/2019 | Müller | B60R 25/2018 |

* cited by examiner

METHOD FOR INITIALIZING A MOTOR VEHICLE

BACKGROUND OF THE INVENTION

The invention relates to a method for initializing a motor vehicle. The invention furthermore relates to a device, a rolling chassis, a vehicle body, a computer program and a machine-readable memory medium.

A rolling chassis generally refers to a chassis or a running gear comprising a drive motor and a drivetrain, such that a rolling chassis can travel under its own drive power.

A vehicle body is commonly arranged on such a rolling chassis.

An advantage in the use of a rolling chassis lies in particular in the fact that several possible vehicle bodies can be provided for one rolling chassis, such that different motor vehicles can be produced efficiently.

The rolling chassis here may have or provide other functionalities and/or components than the vehicle body.

As a result, for example, functionalities which are not available by means of the vehicle body cannot be operated by the rolling chassis. For example, functionalities cannot be operated and executed in the rolling chassis because, for example, data are not available from the vehicle body.

This circumstance needs to be taken into consideration in the initialization of a motor vehicle.

SUMMARY OF THE INVENTION

The object on which the invention is based can be seen in providing a concept for efficiently initializing a motor vehicle, wherein the motor vehicle comprises an arrangement having a rolling chassis and a vehicle body arranged on the rolling chassis.

Said object is achieved by means of the respective subject matter of the independent claims. Respectively dependent subclaims relate to advantageous refinements of the invention.

According to a first aspect, a method is provided for initializing a motor vehicle, wherein the motor vehicle comprises an arrangement having a rolling chassis and a vehicle body arranged on the rolling chassis comprising the following steps:
 receiving first specification signals which represent a first specification of the rolling chassis, wherein the first specification indicates which components and/or which functionalities can be provided solely by means of the rolling chassis, wherein the first specification furthermore indicates parameters for parameterizing the indicated components and/or functionalities of the rolling chassis,
 receiving second specification signals which represent a second specification of the vehicle body, wherein the second specification indicates which components and/or which functionalities can be provided solely by means of the vehicle body, wherein the second specification furthermore indicates parameters for parameterizing the indicated components and/or functionalities of the vehicle body,
 determining on the basis of the first and second specification which of the components and/or which of the functionalities of the rolling chassis and of the vehicle body can be provided by means of the arrangement consisting of rolling chassis and vehicle body,
 generating initialization signals, which represent initialization data for initializing the motor vehicle, on the basis of the first and second specification, and
 outputting the generated initialization signals in order to initialize the motor vehicle.

According to a second aspect, a device is provided which is configured to execute all of the steps of the method according to the first aspect.

According to a third aspect, a rolling chassis is provided which comprises the device according to the second aspect.

According to a fourth aspect, a vehicle body is provided which comprises the device according to the second aspect.

According to a fifth aspect, a motor vehicle is provided comprising an arrangement consisting of a rolling chassis and a vehicle body arranged on the rolling chassis, and the device according to the second aspect.

According to a sixth aspect, a computer program is provided which comprises commands which, when the computer program is executed by a computer, for example by the device according to the second aspect, cause said computer or said device to execute a method according to the first aspect.

According to a seventh aspect, a machine-readable memory medium is provided on which the computer program according to the sixth aspect is stored.

The invention is based on and includes the knowledge that the above object can be achieved in that, after the vehicle body is arranged on the rolling chassis, the following actions are carried out automatically:
 checking which components and/or functionalities are available in the rolling chassis and which components and/or functionalities are available in the vehicle body;
 defining which components and/or functionalities are available from the combination of rolling chassis and vehicle body; and
 initializing, in particular parameterizing, the components and/or functionalities in the rolling chassis and in the vehicle body in accordance with the combination of rolling chassis and vehicle body.

In other words, this means that the above object can be achieved in that it is determined on the basis of the first and second specification which of the components and/or which of the functionalities of the rolling chassis and of the vehicle body can be provided by means of the arrangement consisting of rolling chassis and vehicle body, wherein, in accordance with a result of this determination, initialization signals are generated, which represent initialization data for initializing the motor vehicle, on the basis of the first and second specification.

The initialization data therefore refer in particular to data which are suitable for initializing the motor vehicle.

An initializing of the motor vehicle comprises in particular defining permissible driving properties, in particular acceleration, speeds, cornering speeds and maximum speeds.

An initializing of the motor vehicle comprises in particular defining whether a trailer may be attached to the motor vehicle.

An initializing of the motor vehicle comprises in particular defining braking properties.

The definition should be considered with respect to the arrangement of rolling chassis and vehicle body, i.e. for the motor vehicle. This is because it is then possible to differentiate the permissible driving properties and/or whether a trailer may be attached to the motor vehicle and/or the braking properties of a motor vehicle, for example of a sports motor vehicle comprising a sports vehicle body, from a motor vehicle, for example a sprinter motor vehicle comprising a sprinter vehicle body.

Thus, in particular, the technical advantage is therefore brought about that the motor vehicle can be initialized efficiently. That is therefore to say in particular that a concept for efficiently initializing a motor vehicle is thereby provided in an advantageous manner.

Furthermore, different vehicle bodies can be used in an efficient way for a rolling chassis.

According to one embodiment, it is provided that the method is carried out or executed automatically after the vehicle body is arranged on the motor vehicle.

According to one embodiment, it is provided that the method is initiated manually after the vehicle body is arranged on the rolling chassis.

According to one embodiment, the method according to the first aspect is a computer-implemented method.

According to one embodiment, it is provided that chassis specification demand signals are generated and output which represent a demand for the first specification, and therefore the first specification signals are received in response to the outputting of the chassis specification demand signals.

Thus, for example, the technical advantage is achieved that the first specification can be attained or received efficiently.

According to one embodiment, it is provided that chassis identification signals are received which represent a chassis identification of the rolling chassis, wherein the chassis specification demand signals are generated on the basis of the chassis identification, and therefore the demand for the first specification comprises the chassis identification.

Thus, for example, the technical advantage is achieved that the first specification can be requested efficiently. For example, the chassis identification can be used in order to read the first specification from a database comprising a plurality of specifications for a plurality of chassis.

According to one embodiment, it is provided that vehicle body specification demand signals are generated and output which represent a demand for the second specification, and therefore the second specification signals are received in response to the outputting of the vehicle body specification demand signals.

Thus, for example, the technical advantage is achieved that the second specification can be obtained or received efficiently.

According to one embodiment, it is provided that vehicle body identification signals are received which represent a vehicle body identification of the vehicle body, wherein the vehicle body specification demand signals are generated on the basis of the vehicle body identification, and therefore the demand for the second specification comprises the vehicle body identification.

Thus, for example, the technical advantage is achieved that the second specification can be requested efficiently. For example, the vehicle body identification can be used in order to read the second specification from a database comprising a plurality of specifications for a plurality of vehicle bodies.

According to one embodiment, it is provided that the outputting of the demand signals for the corresponding specification comprises sending the demand signals to a local memory and/or sending the demand signals via a communication network to a remote specification server.

Thus, for example, the technical advantage is achieved that the corresponding specification can be obtained or received efficiently.

The demand signals in this embodiment are a generic term for the vehicle body specification demand signals and/or for the chassis specification demand signals.

A communication network within the meaning of the description comprises, for example, a WLAN communication network and/or a mobile network.

A local memory is, for example, integrated in the device or included by the latter.

A local memory is, for example, included by the vehicle body, by the rolling chassis and/or by the motor vehicle.

According to one embodiment, it is provided that the initialization data comprise parameters for a respective parameterizing of the determined components and/or functionalities and/or function state data which indicate which components and/or functionalities may be enabled for use.

Thus, for example, the technical advantage is achieved that the determined components and/or functionalities can be efficiently parameterized. Furthermore, for example, the technical advantage is thereby achieved that it can be efficiently indicated which components and/or functionalities may be enabled for use.

A parameterizing comprises, for example, defining in which position, in particular at which height, a sensor, in particular a surroundings sensor, in particular a video camera comprising a video sensor, is arranged on the vehicle body. This differs, for example, for a sprinter and a convertible. Thus, for example, the fact that sensors can be arranged at different positions in different vehicle bodies can be efficiently taken into consideration.

A parameterizing comprises, for example, defining motor settings of a drive motor of the rolling chassis. That is to say, it is defined in particular which motor settings are expedient and/or necessary and/or prescribed on the basis of the superstructure.

A parameterizing comprises, for example, defining a braking behavior. That is to say, it is determined in particular how the motor vehicle behaves, with it being defined on the basis of the behavior how braking has to take place. For example, a sprinter has a different center of gravity from a passenger vehicle. Braking therefore has to be carried out differently. For example, an electronic stability program (ESP) has to behave differently. That is therefore to say in particular that defining a braking behavior comprises defining ESP parameters.

According to one embodiment, it is provided that one or more method steps and/or at least some, in particular all, initialization data are documented, in particular are documented in a blockchain.

Thus, for example, the technical advantage is achieved that, even after the method has been carried out, it can be understood efficiently on the basis of the documentation how the method has proceeded in detail. The use of a blockchain for the documenting has in particular the technical advantage that the steps can be documented in a manipulation-proof manner.

According to one embodiment, it is provided that prior to the outputting of the generated initialization signals in order to initialize the motor vehicle, the initialization data are sent for checking to a remote checking facility via a communication network, wherein, in response to the sending of the initialization data to the remote checking facility, result signals are received which represent a result of the checking by the remote checking facility, wherein, depending on the result, the generated initialization signals are output or the initialization data are revised on the basis of the result, such that revised initialization signals are generated and output which represent the revised initialization data.

Thus, for example, the technical advantage is achieved that efficient checking of the initialization data can be carried out.

A remote checking facility comprises, for example, a manufacturer of the rolling chassis and/or a manufacturer of the vehicle body and/or the TÜV (Technischer Überwachungsverein [Technical Inspection Association]).

For example, it is provided that operation of the motor vehicle is disabled before the result is received.

For example, it can therefore be ensured in an efficient and advantageous manner that, prior to the operation of the motor vehicle, the initialization data can be checked.

The result of the remote checking facility can indicate, for example, that the initialization data are free from error.

In this case, it is then provided, for example, that the generated initialization signals are output.

The result of the remote checking facility can indicate, for example, that the initialization data have errors. In this case, it can be provided, for example, that the revision of the initialization signals comprises correcting the errors.

The result of the remote checking facility can indicate, for example, that one or more components and/or one or more functionalities may be made available only to a limited extent, if at all. In this case, the revising of the initialization data comprises, for example, revising the corresponding parameters and/or the functional state data on the basis of this result.

According to one embodiment, it is provided that the method according to the first aspect is executed by means of the device according to the second aspect.

Technical functionalities of the device according to the second aspect emerge in an analogous manner from corresponding technical functionalities of the method according to the first aspect, and vice versa.

That is therefore to say in particular that device features emerge from corresponding method features, and vice versa.

A chassis within the meaning of the description is a motor vehicle chassis. That is therefore to say that a rolling chassis is a motor vehicle chassis.

A vehicle body within the meaning of the description is a motor vehicle body.

For the German expression "Karosserie" ["vehicle body"], the terms "body" or "top hat" may be used in English. It follows from this that the expression "Karosserie" ["vehicle body"] in German may also be substituted by the expression "Aufbau" ["superstructure"].

According to one embodiment, the expression "vehicle body" or "motor vehicle body" may be interpreted broadly. For example, according to one embodiment, the vehicle body may comprise one or more of the following components: motor vehicle seat, dashboard, gear shift lever, motor vehicle window, motor vehicle door, motor vehicle interior trim, air bag, assistance system, video camera, human-machine interface, tachometer.

The expression "vehicle body" can thus refer in the context of this description to the upper part ("top hat") of a motor vehicle, which is arranged on a chassis. The vehicle body may thus, analogously to a prefabricated part of a prefabricated house, be a component that has already been manufactured to such a degree that a finished motor vehicle, that is to say in particular a motor vehicle which is ready to drive, is formed after the vehicle body has been arranged on the rolling chassis.

According to one embodiment, a rolling chassis comprises one or more of the following components: wheel, axle, drive motor, steering system, brake, frame, thermal components, battery, battery housing, sensor, in particular surroundings sensor (for example: radar sensor, lidar sensor, ultrasound sensor, magnetic field sensor, infrared sensor, video sensor), control unit (referred to as "ECU", "electronic control unit"), PC (personal computer).

According to one embodiment, the rolling chassis may thus, analogously to a prefabricated part of a prefabricated house, be a component that has already been manufactured to such a degree that a finished motor vehicle, that is to say in particular a motor vehicle that is ready to drive, is formed after the vehicle body has been arranged on the rolling chassis.

The rolling chassis thus refers in particular to the lower component in relation to the upper component (vehicle body). Thus, according to one embodiment, a finished motor vehicle, that is to say in particular a motor vehicle that is ready to drive, is formed as a result of the arrangement of the upper component (vehicle body) and lower component (rolling chassis), wherein the upper component is arranged on the lower component.

BRIEF DESCRIPTION OF THE DRAWINGS

Exemplary embodiments of the invention are illustrated in the drawings and will be discussed in more detail in the following description.

In the drawings.

DETAILED DESCRIPTION

Figure 1:
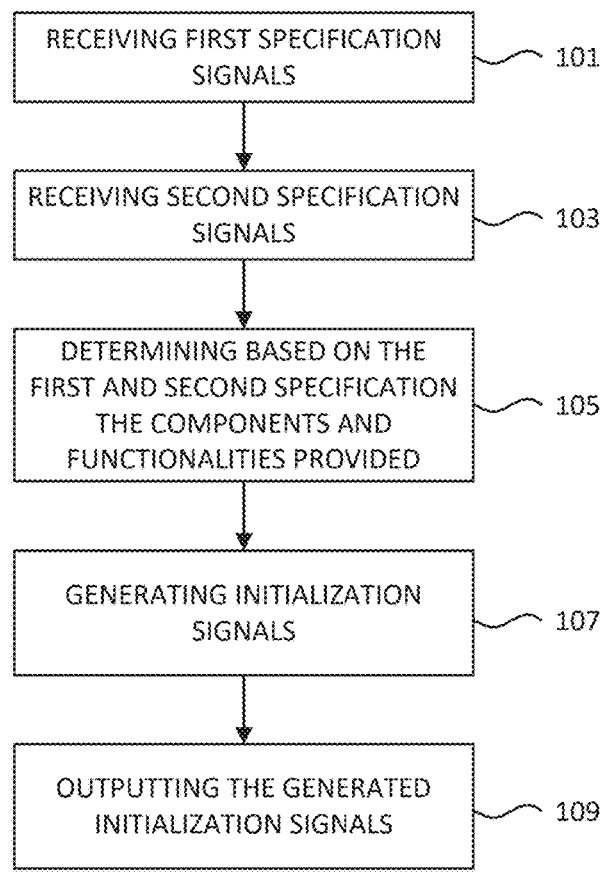
FIG. 1 shows a flow diagram of a method for initializing a motor vehicle.

FIG. 1 shows a flow diagram of a method for initializing a motor vehicle, wherein the motor vehicle comprises an arrangement having a rolling chassis and a vehicle body arranged on the rolling chassis, comprising the following steps:

receiving 101 first specification signals which represent a first specification of the rolling chassis, wherein the first specification indicates which components and/or which functionalities can be provided solely by means of the rolling chassis, wherein the first specification furthermore indicates parameters for parameterizing the indicated components and/or functionalities of the rolling chassis, receiving 103 second specification signals which represent a second specification of the vehicle body, wherein the second specification indicates which components and/or which functionalities can be provided solely by means of the vehicle body, wherein the second specification furthermore indicates parameters for parameterizing the indicated components and/or functionalities of the vehicle body, determining 105 on the basis of the first and second specification which of the components and/or which of the functionalities of the rolling chassis and of the vehicle body can be provided by means of the arrangement consisting of rolling chassis and vehicle body, generating 107 initialization signals, which represent initialization data for initializing the motor vehicle, on the basis of the first and second specification, and outputting 109 the generated initialization signals in order to initialize the motor vehicle.

According to one embodiment, it is provided that the vehicle body automatically transfers or transmits all of the information, i.e. which components are present, which functionalities are possible with the vehicle body, and what the parameterizations are in the rolling chassis for the vehicle body, to the rolling chassis. That is therefore to say that the vehicle body automatically provides the second specification of the vehicle body.

In another embodiment, it is provided that the rolling chassis interrogates the second specification from the vehicle body.

In one embodiment, it is provided that the second specification stored in the vehicle body is updated over a period of time. This may for example be performed offline in a workshop or online, for example from a cloud infrastructure, or can be carried out by an end customer themself.

In one embodiment, a vehicle body identification is stored in the vehicle body. According to one embodiment, this vehicle body identification is transmitted automatically to the rolling chassis and/or is interrogated from the vehicle body by the rolling chassis.

According to one embodiment, the rolling chassis can retrieve the second specification via the vehicle body identification and configure, i.e. in particular parameterize, and, if necessary, also enable the corresponding functionalities and components.

In one embodiment, it is provided that the second specification is stored in the rolling chassis. According to one embodiment, these data, i.e. the second specification, in the rolling chassis can be updated over a period of time. For example, in a workshop or online, for example from a cloud, and/or by an end customer themself.

In one embodiment, the second specification is stored externally, for example in a cloud infrastructure. According to one embodiment, the rolling chassis requests the second specification from the cloud infrastructure.

According to one embodiment, it is provided that the data in the cloud infrastructure, i.e. the second specification, are updated over a period of time, for example by a manufacturer (OEM).

In one embodiment, the functional states (enable operations) and parameterizations are documented since it is also possible here to carry out safety-critical modifications that have, however, primarily been released, for example, by a manufacturer. According to one embodiment, the documenting is carried out using one or more falsification-proof methods, for example using blockchain mechanisms.

According to one embodiment, it is provided that the functional states (enable operations) and parameterizations are additionally sent for checking analysis to a checker responsible for this purpose (remote checking facility) (for example OEM; TÜV) and only after release by the latter is the rolling chassis with the vehicle body enabled. That is therefore to say in particular that, for example, no journey and/or use of the arrangement consisting of rolling chassis and vehicle body is possible previously.

Figure 2:
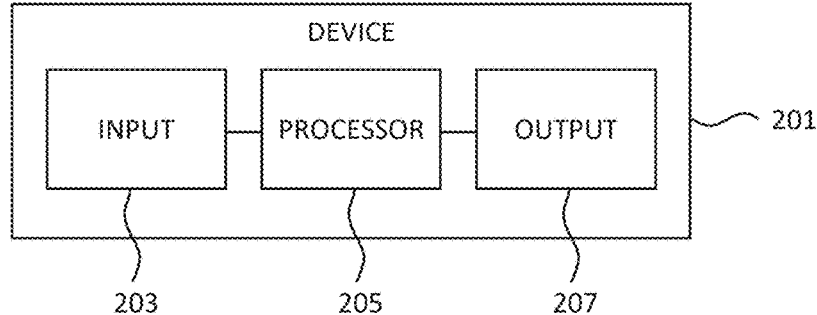
FIG. 2 shows a device.

FIG. 2 shows a device 201.

The device 201 is configured to execute all of the steps of the method according to the first aspect.

The device 201 comprises an input 203 which is configured to receive the first specification signals and the second specification signals.

The device 201 furthermore comprises a processor 205 which is configured to determine, on the basis of the first and second specification, which of the components and/or which of the functionalities of the rolling chassis and of the vehicle body can be provided by means of the arrangement consisting of rolling chassis and vehicle body.

The processor 205 is furthermore configured to generate the initialization signals on the basis of the first and second specification.

The device 201 furthermore comprises an output 207 which is configured to output the generated initialization signals in order to initialize the motor vehicle.

In an embodiment which is not shown, the device 201 comprises a plurality of processors instead of the one processor 205.

Signals which are received are received in particular by means of the input 203. The input 203 is therefore configured to receive the corresponding signals.

Signals which are output are output in particular by means of the output 207. That is therefore to say in particular that the output 207 is correspondingly configured to output the corresponding signals.

Signals which are generated are generated in particular by means of the processor 205. The processor 205 is therefore configured in particular to generate the corresponding signals.

Figure 3:
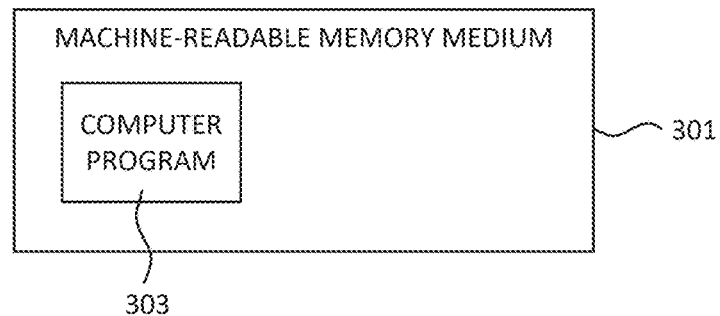
FIG. 3 shows a machine-readable memory medium.

FIG. 3 shows a machine-readable memory medium 301.

A computer program 303 is stored on the machine-readable memory medium 301. The computer program 303 comprises commands which, when the computer program 303 is executed by a computer, cause said computer to execute a method according to the first aspect.

Figure 4:
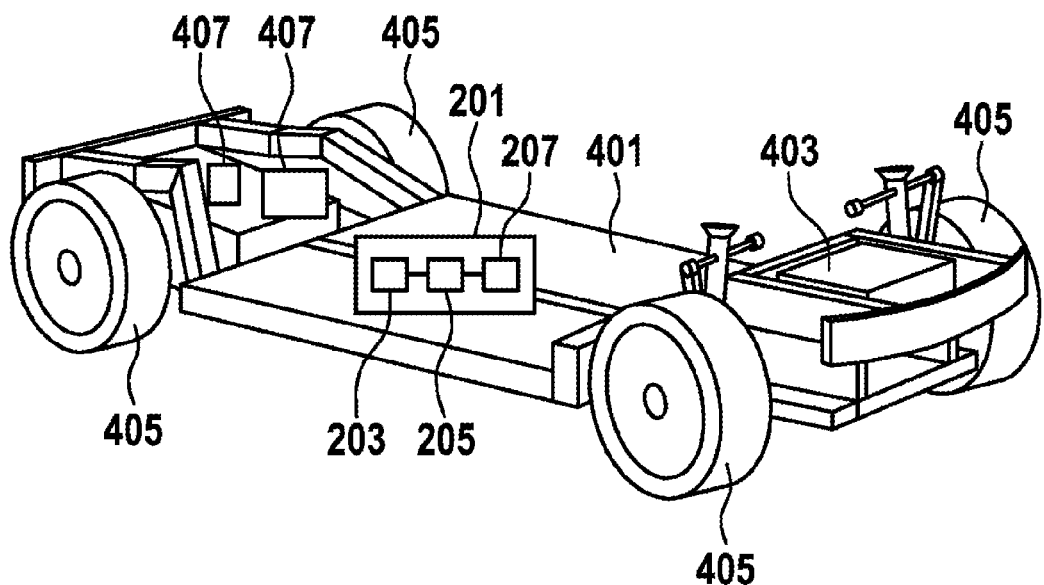
FIG. 4 shows a first rolling chassis.

FIG. 4 shows a first rolling chassis 401.

The rolling chassis 401 comprises a drive motor 403 and four wheels 405.

The rolling chassis 401 furthermore comprises multiple components 407. The components 407 may for example be one or more of the components referred to above that have been described in conjunction with the rolling chassis.

The rolling chassis 401 furthermore comprises the device 201 as per FIG. 2.

Figure 5:
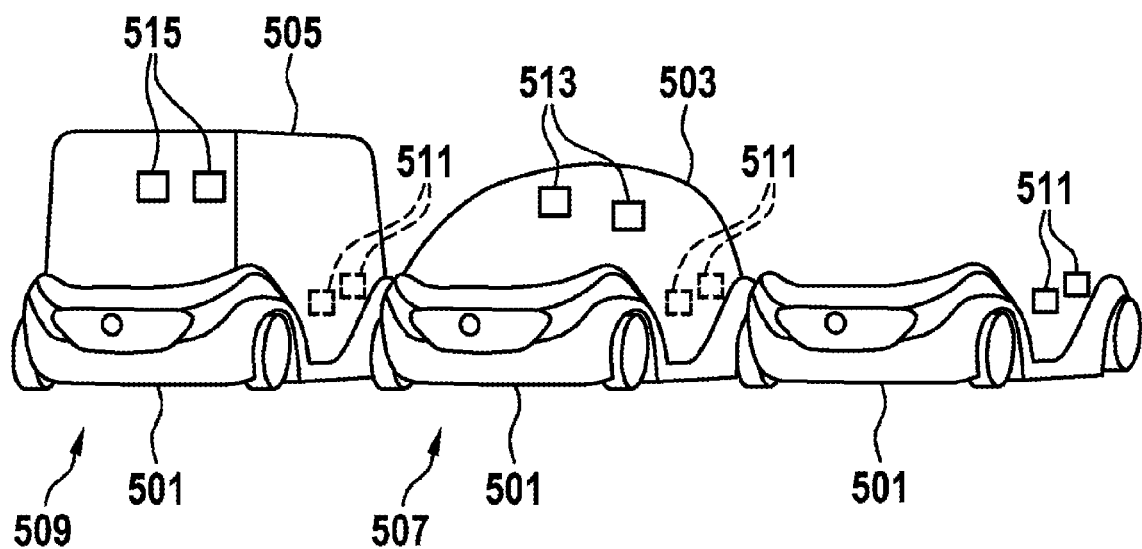
FIG. 5 shows a second rolling chassis and two different vehicle bodies.

FIG. 5 shows three examples of the same second rolling chassis 501 comprising multiple components 511. The components 511 may for example be one or more of the components referred to above that have been described in conjunction with the rolling chassis.

A second rolling chassis 501 without a vehicle body is shown at the far right in FIG. 5.

At the far left and in the center, there is shown in each case one second rolling chassis 501 with a different vehicle body 503, 505 (first vehicle body 503 and second vehicle body 505), wherein the corresponding vehicle bodies 503, 505 are arranged on the corresponding rolling chassis 501.

The first vehicle body 503 comprises multiple components 513.

The second vehicle body 505 comprises multiple components 515.

The components 513 and 515 may for example be one or more of the components referred to above that have been described in conjunction with the vehicle body.

Thus, FIG. 5 shows two motor vehicles: a first motor vehicle 507 comprising the arrangement of the second rolling chassis 501 and the first vehicle body 503, and a second motor vehicle 509 comprising an arrangement consisting of the second rolling chassis 501 and the second vehicle body 505.

According to one embodiment, it may be provided that the rolling chassis 501 comprises the device 201 as per FIG. 2.

According to one embodiment, it may be provided that, in addition to or instead of the rolling chassis 501, the two vehicle bodies 503, 505 also comprise the device 201 as per FIG. 2.

According to one embodiment, it is provided that the method according to the first aspect is automatically executed after the vehicle bodies 503, 505 have been arranged on the corresponding rolling chassis 501.

Therefore, the two motor vehicles 507, 509 can be efficiently initialized in an advantageous and efficient manner.

The invention claimed is:

1. A method for initializing a motor vehicle (507, 509), wherein the motor vehicle (507, 509) comprises an arrangement having a rolling chassis (401, 501) and a vehicle body (503, 505) arranged on the rolling chassis (401, 501), the method comprising the following steps:
    receiving (101) first specification signals which represent a first specification of the rolling chassis (401, 501), wherein the first specification indicates which components and/or which functionalities can be provided solely by means of the rolling chassis (401, 501), wherein the first specification furthermore indicates parameters for parameterizing the indicated components and/or functionalities of the rolling chassis (401, 501),
    receiving (103) second specification signals which represent a second specification of the vehicle body (503, 505), wherein the second specification indicates which components and/or which functionalities can be provided solely by means of the vehicle body (503, 505), wherein the second specification furthermore indicates parameters for parameterizing the indicated components and/or functionalities of the vehicle body (503, 505),
    determining (105) on the basis of the first and second specification which of the components and/or which of the functionalities of the rolling chassis (401, 501) and of the vehicle body (503, 505) can be provided by means of the arrangement consisting of rolling chassis (401, 501) and vehicle body (503, 505),
    generating (107) initialization signals, which represent initialization data for initializing the motor vehicle (507, 509), on the basis of the first and second specification,
    sending the initialization signals to a remote checking facility via a communication network, wherein, in response to the sending of the initialization signals to the remote checking facility, result signals are received which represent a result of the checking by the remote checking facility, wherein, depending on the result, the generated initialization signals are output or the initialization data are revised on the basis of the result, such that revised initialization signals, which represent the revised initialization data, are generated and output,
    disabling operation of the motor vehicle (507, 509) until the initialization signals are returned, and
    outputting (109) the generated initialization signals or revised initialization signals in order to initialize the motor vehicle (507, 509).

2. The method as claimed in claim 1, wherein chassis specification demand signals are generated and output which represent a demand for the first specification, and the first specification signals are received in response to the outputting of the chassis specification demand signals.

3. The method as claimed in claim 2, wherein chassis identification signals are received which represent a chassis identification of the rolling chassis (401, 501), wherein the chassis specification demand signals are generated on the basis of the chassis identification, and the demand for the first specification comprises the chassis identification.

4. The method as claimed in claim 1, wherein vehicle body specification demand signals are generated and output which represent a demand for the second specification, and the second specification signals are received in response to the outputting of the vehicle body specification demand signals.

5. The method as claimed in claim 4, wherein vehicle body identification signals are received which represent a vehicle body identification of the vehicle body (503, 505), wherein the vehicle body specification demand signals are generated on the basis of the vehicle body identification, and therefore the demand for the second specification comprises the vehicle body identification.

6. The method as claimed in claim 2, wherein the outputting of the demand signals for the corresponding specification comprises sending the demand signals to a local memory and/or sending the demand signals via a communication network to a remote specification server.

7. The method as claimed in claim 1, wherein the initialization data comprise parameters for a respective parameterizing of the determined components and/or functionalities and/or function state data which indicate which components and/or functionalities may be enabled for use.

8. The method as claimed in claim 1, wherein initialization data are documented in a blockchain.

9. A device (201) to initialize a motor vehicle (507, 509) that includes a rolling chassis (401, 501) and a vehicle body (503, 505), the device (201) comprising a processor (205) which is configured to:
    receive (101) first specification signals which represent a first specification of the rolling chassis (401, 501), wherein the first specification indicates which components and/or which functionalities can be provided solely by means of the rolling chassis (401, 501), wherein the first specification furthermore indicates parameters for parameterizing the indicated components and/or functionalities of the rolling chassis (401, 501),
    receive (103) second specification signals which represent a second specification of the vehicle body (503, 505), wherein the second specification indicates which components and/or which functionalities can be provided solely by means of the vehicle body (503, 505), wherein the second specification furthermore indicates parameters for parameterizing the indicated components and/or functionalities of the vehicle body (503, 505),
    determine (105) on the basis of the first and second specification which of the components and/or which of the functionalities of the rolling chassis (401, 501) and of the vehicle body (503, 505) can be provided by means of the arrangement consisting of rolling chassis (401, 501) and vehicle body (503, 505),
    generate (107) initialization signals, which represent initialization data for initializing the motor vehicle (507, 509), on the basis of the first and second specification,
    send the initialization signals to a remote checking facility via a communication network, wherein, in response to the sending of the initialization signals to the remote checking facility, result signals are received which represent a result of the checking by the remote checking facility, wherein, depending on the result, the generated initialization signals are output or the initialization data are revised on the basis of the result, such that revised initialization signals, which represent the revised initialization data, are generated and output, disable operation of the motor vehicle (507, 509) until the initialization signals are returned, and output (109) the generated initialization signals or revised initialization signals in order to initialize the motor vehicle (507, 509).

10. A non-transitory computer-readable medium (301) containing instructions that when executed on a computer cause the computer to control a motor vehicle (507, 509) having a rolling chassis (401, 501) and a vehicle body (503, 505) arranged on the rolling chassis (401, 501), by:

receiving (101) first specification signals which represent a first specification of the rolling chassis (401, 501), wherein the first specification indicates which components and/or which functionalities can be provided solely by means of the rolling chassis (401, 501), wherein the first specification furthermore indicates parameters for parameterizing the indicated components and/or functionalities of the rolling chassis (401, 501), receiving (103) second specification signals which represent a second specification of the vehicle body (503, 505), wherein the second specification indicates which components and/or which functionalities can be provided solely by means of the vehicle body (503, 505), wherein the second specification furthermore indicates parameters for parameterizing the indicated components and/or functionalities of the vehicle body (503, 505), determining (105) on the basis of the first and second specification which of the components and/or which of the functionalities of the rolling chassis (401, 501) and of the vehicle body (503, 505) can be provided by means of the arrangement consisting of rolling chassis (401, 501) and vehicle body (503, 505), generating (107) initialization signals, which represent initialization data for initializing the motor vehicle (507, 509), on the basis of the first and second specification, sending the initialization signals to a remote checking facility via a communication network, wherein, in response to the sending of the initialization signals to the remote checking facility, result signals are received which represent a result of the checking by the remote checking facility, wherein, depending on the result, the generated initialization signals are output or the initialization data are revised on the basis of the result, such that revised initialization signals, which represent the revised initialization data, are generated and output, disabling operation of the motor vehicle (507, 509) until the initialization signals are returned, and outputting (109) the generated initialization signals or revised initialization signals in order to initialize the motor vehicle (507, 509).

\* \* \* \* \*